United States Patent
Bianco et al.

(10) Patent No.: US 10,142,230 B2
(45) Date of Patent: Nov. 27, 2018

(54) METHOD AND APPARATUS FOR TRANSMITTING MESSAGES ASSOCIATED WITH INTERNET PROTOCOL VERSION 4 (IPV4) ADDRESSES ON AN INTERNET PROTOCOL VERSION 6 (IPV6) NETWORK

(71) Applicant: VONAGE BUSINESS INC., Atlanta, GA (US)

(72) Inventors: Itay Bianco, Tel-Aviv (IL); Sagi Iltus, Hadera (IL); Gil Osher, Marietta, GA (US); Matthew Dennis Krokosz, Wall, NJ (US); Natan Shaltiel, Tel-Aviv (IL); Sagie Machlin, Rishon Lezion (IL)

(73) Assignee: Vonage Business Inc., Atlanta, GA (US)

( * ) Notice: Subject to any disclaimer, the term of this patent is extended or adjusted under 35 U.S.C. 154(b) by 11 days.

(21) Appl. No.: 15/236,842

(22) Filed: Aug. 15, 2016

(65) Prior Publication Data
US 2018/0048564 A1 Feb. 15, 2018

(51) Int. Cl.
*H04L 12/741* (2013.01)
*H04L 29/12* (2006.01)

(52) U.S. Cl.
CPC .......... *H04L 45/74* (2013.01); *H04L 61/1511* (2013.01); *H04L 61/251* (2013.01); *H04L 61/6059* (2013.01)

(58) Field of Classification Search
CPC . H04L 61/6059; H04L 45/74; H04L 61/2007; H04L 29/12066; H04L 61/1511; H04L 61/251; H04L 9/321; H04L 29/12254; H04L 29/12915; H04L 29/12009; H04L 45/741; H04L 29/06;
(Continued)

(56) References Cited

U.S. PATENT DOCUMENTS 6,862,274 B1    3/2005   Tsao et al.
7,526,562 B1 *   4/2009   Samprathi ......... H04L 29/12066
                                           370/466
(Continued)

FOREIGN PATENT DOCUMENTS

EP          2770700 A1    8/2014
WO    WO-0209387 A1    1/2002

OTHER PUBLICATIONS

"How do I enable reverse DNS lookup in Amazon Route 53?" from Amazon Web Services. Downloaded from website https://aws.amazon.com/premiumsupport/knowledge-center/route-53-reverse-dns/.

(Continued)

*Primary Examiner* — Wutchung Chu
(74) *Attorney, Agent, or Firm* — Moser Taboada; Joseph Pagnotta (57) ABSTRACT

A computer-implemented method for transmitting messages associated with IPv4 addresses on an IPv6 network comprising: receiving, in a first message from an IPv4 network, an IPv4 address of a component in the IPv4 network; parsing the IPv4 address into a plurality of elements; creating a new host name for the IPv4 address based on the parsed plurality of elements; sending, to a domain name server (DNS) associated with the IPv6 network, a request to perform a DNS lookup of the host name; responsive to the DNS lookup request, receiving an IPv6 address; and processing the first message as if it were originally received with the IPv6 address.

20 Claims, 4 Drawing Sheets

(58) Field of Classification Search
CPC .................. H04L 47/70; H04L 63/1466; H04L 29/12028
See application file for complete search history.

(56) References Cited

U.S. PATENT DOCUMENTS

| | | | | |
|---|---|---|---|---|
| 7,764,686 B1* | 7/2010 | Toebes | ............. | H04L 61/251 370/392 |
| 7,924,822 B2 | 4/2011 | Holder et al. | | |
| 7,953,076 B2 | 5/2011 | Kim et al. | | |
| 8,719,450 B2* | 5/2014 | Donley | ............. | H04L 69/22 709/228 |
| 8,909,812 B2* | 12/2014 | Huang | ............. | H04L 29/12358 709/246 |
| 9,419,940 B2* | 8/2016 | Zou | ............. | H04L 61/251 |
| 9,679,022 B2* | 6/2017 | Kitamura | ............. | H04L 61/1511 |
| 9,742,795 B1* | 8/2017 | Radlein | ............. | H04L 63/1441 |
| 9,774,619 B1* | 9/2017 | Radlein | ............. | H04L 63/1441 |
| 9,794,281 B1* | 10/2017 | Radlein | ............. | H04L 63/1416 |
| 2003/0110292 A1* | 6/2003 | Takeda | ............. | H04L 29/06 709/245 |
| 2004/0073707 A1* | 4/2004 | Dillon | ............. | H04L 29/12009 709/245 |
| 2004/0233916 A1* | 11/2004 | Takeuchi | ............. | H04L 29/12066 370/395.54 |
| 2004/0246991 A1* | 12/2004 | Tsuzuki | ............. | H04L 29/12358 370/466 |
| 2005/0066038 A1* | 3/2005 | Sakamoto | ............. | H04L 29/06027 709/227 |
| 2005/0286553 A1* | 12/2005 | Wetterwald | ............. | H04L 29/12009 370/466 |
| 2006/0104226 A1 | 5/2006 | Ahn | | |
| 2008/0080519 A1* | 4/2008 | Park | ............. | H04L 29/12066 370/395.54 |
| 2011/0035437 A1* | 2/2011 | Toumura | ............. | H04L 29/12066 709/203 |
| 2011/0038377 A1* | 2/2011 | Haddad | ............. | H04L 69/16 370/395.53 |
| 2011/0153831 A1* | 6/2011 | Mutnuru | ............. | H04L 29/12066 709/226 |
| 2011/0211553 A1* | 9/2011 | Haddad | ............. | H04L 29/12358 370/331 |
| 2011/0307629 A1* | 12/2011 | Haddad | ............. | H04L 29/12358 709/245 |
| 2012/0054869 A1* | 3/2012 | Yen | ............. | H04L 29/12066 726/24 |
| 2012/0110210 A1* | 5/2012 | Huang | ............. | H04L 29/12358 709/246 |
| 2012/0259998 A1* | 10/2012 | Kaufman | ............. | H04L 61/1511 709/245 |
| 2013/0111065 A1* | 5/2013 | Donley | ............. | H04L 69/22 709/245 |
| 2013/0212127 A1* | 8/2013 | Kitamura | ............. | H04L 61/1511 707/770 |
| 2013/0232278 A1* | 9/2013 | Zou | ............. | H04L 61/251 709/245 |
| 2013/0332562 A1* | 12/2013 | Naidu | ............. | H04L 65/1016 709/217 |
| 2014/0258491 A1* | 9/2014 | Forristal | ............. | H04L 45/741 709/223 |
| 2016/0149748 A1* | 5/2016 | Pan | ............. | H04L 61/251 370/389 |
| 2016/0218978 A1* | 7/2016 | Lapidous | ............. | H04L 61/6009 |
| 2016/0344688 A1* | 11/2016 | Lakhera | ............. | H04L 61/251 |
| 2018/0097729 A1* | 4/2018 | Srivastav | ............. | H04L 45/7453 |

OTHER PUBLICATIONS

"Reverse DNS lookup" from Wikipedia, the free encyclopedia. Downloaded from website https://en.wikipedia.org/wiki/Reverse_DNS_lookup.
"IPv6 transition mechanism" from Wikipedia, the free encyclopedia. Downloaded from website https://en.wikipedia.org/wiki/IPv6_transition_mechanism.
Nakajima, et al., "IPv4/IPv6 Translation Technology", FUJITSU Sci. Tech. J., 40, 1, p. 1559-169 (Jun. 2004).

* cited by examiner

METHOD AND APPARATUS FOR TRANSMITTING MESSAGES ASSOCIATED WITH INTERNET PROTOCOL VERSION 4 (IPV4) ADDRESSES ON AN INTERNET PROTOCOL VERSION 6 (IPV6) NETWORK

BACKGROUND OF THE INVENTION

Field of the Invention

Embodiments of the present invention generally relate to a voice over internet protocol (VoIP) service, and more specifically, to methods and apparatus for transmitting messages associated with IPv4 addresses on an IPv6 network.

Description of the Related Art

Internet Protocol version 6 (IPv6) is the most recent version of the Internet Protocol (IP), the communications protocol that provides an identification and location system for computers on networks, and routes traffic across the Internet. IPv6 is meant to replace IPv4 due to the depletion of the pool of unallocated IPv4 addresses. Although many service providers currently use servers in the IPv4 network, some mobile device manufacturers require that the apps developed for their devices use the IPv6-only network.

A Domain Name System 64 (DNS64)/Network Address Translation 64 (NAT64) network, described in Internet Engineering Task Force (IETF) Request for Comments (RFC) Paper No. 3261 entitled, "DNS64: DNS Extensions for Network Address Translation from IPv6 Clients to IPv4 Servers," incorporated herein by reference, is a technology to allow IPv6-only clients to receive special IPv6 addresses that are proxied to IPv4 addresses. This proxy service is then called NAT64. In other words, using the DNS64/NAT64 network, messages (i.e., IPv4 packets) may continue to be sent to clients over an IPv4 network even if the client sending the messages is on an IPv6 network. In current routing solutions, address mapping is performed between the physical layers and transport layers of a protocol stack on a packet-by-packet basis, such that each packet that is received with an IPv4 address, is modified and transmitted with an IPv6 address. However, the above IPv4 to IPv6 routing solution requires extensive modification of a provider's back-end systems where the translation is performed, as well as modification of each individual packet.

Therefore, there is a need in the art for an improved method and apparatus for transmitting messages associated with IPv4 addresses on an IPv6 network that builds on the above techniques.

SUMMARY

Embodiments of the present invention relate to a method for transmitting messages associated with IPv4 addresses on an IPv6 network, when an IPv4 address for a network component is received on an IPv6 network device is provided. The method comprises receiving, in a first message from an IPv4 network, an IPv4 address of a component in the IPv4 network, parsing the IPv4 address into a plurality of elements; creating a new host name for the IPv4 address based on the parsed plurality of elements, and sending to a domain name server (DNS) associated with the IPv6 network, a request to perform a DNS lookup of the host name. In response to the DNS lookup request, an IPv6 address is received. The first message is processed as if it were originally received with the IPv6 address.

Further embodiments relate to a client device that is connected to an IPv6 network, wherein the client application is preconfigured with an IP address conversion format and configured to receive, in a first message from the IPv4 network, an IPv4 address of a component in the IPv4 network; parse the IPv4 address into a plurality of elements; create a new host name for the IPv4 address based on the parsed plurality of elements; send, to a domain name server (DNS) associated with the IPv6 network, a request to perform a DNS lookup of the host name; responsive to the DNS lookup request, receive an IPv6 address; and process the first request as if it were received with the IPv6 address.

A computer-implemented method for transmitting messages associated with IPv4 addresses on an IPv6 network, when an IPv4 address for a network component is received on an IPv6 network device is provided. The computer-implemented method comprises: receiving, in a first message from an IPv4 network, an IPv4 address of a component in the IPv4 network, parsing the IPv4 address into a plurality of elements; creating a new host name for the IPv4 address based on the parsed plurality of elements, and sending to a domain name server (DNS) associated with the IPv6 network, a request to perform a DNS lookup of the host name. In response to the DNS lookup request, an IPv6 address is received. The first message is processed as if it were originally received with the IPv6 address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to methods and apparatus for transmitting messages/packets associated with IPv4 addresses on an IPv6 network. According to an exemplary embodiment, when a message, for example, a request, response, media, or the like is received on a client device, the message includes an address where a response is to be sent. A response, as used herein, includes a message response, media, future requests, and the like. The client device is on an IPv6 network however, the address is typically an IPv4 address. An application on the client device converts the IPv4 address to a new host name, and sends the converted host name to a DNS64 server, which returns an IPv6 address. The client application transmits the response message to the returned IPv6 address as if the received message were originally received with the IPv6 address. From then on, when the client device sends a message on the IPv6 network, the message is routed to the network component associated with the IPv4 address originally received in the message. As used herein, messages and packets associated with IPv4 addresses include, but are not limited to, SIP responses, requests, media packets, and the like that include or are otherwise directed to IPv4 addresses.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any native application may be used in embodiments consistent with the present invention without departing from the principles of the disclosure described herein.

In the following description, the terms VOIP system, VOIP telephony system, IP system and IP telephony system are all intended to refer to a system that connects callers and that delivers data, text, video, and voice communications using Internet protocol data communications. Those of ordinary skill in the art will recognize that embodiments of the present invention are not limited to use with IP telephony systems and may also be used in other systems.

Figure 1:
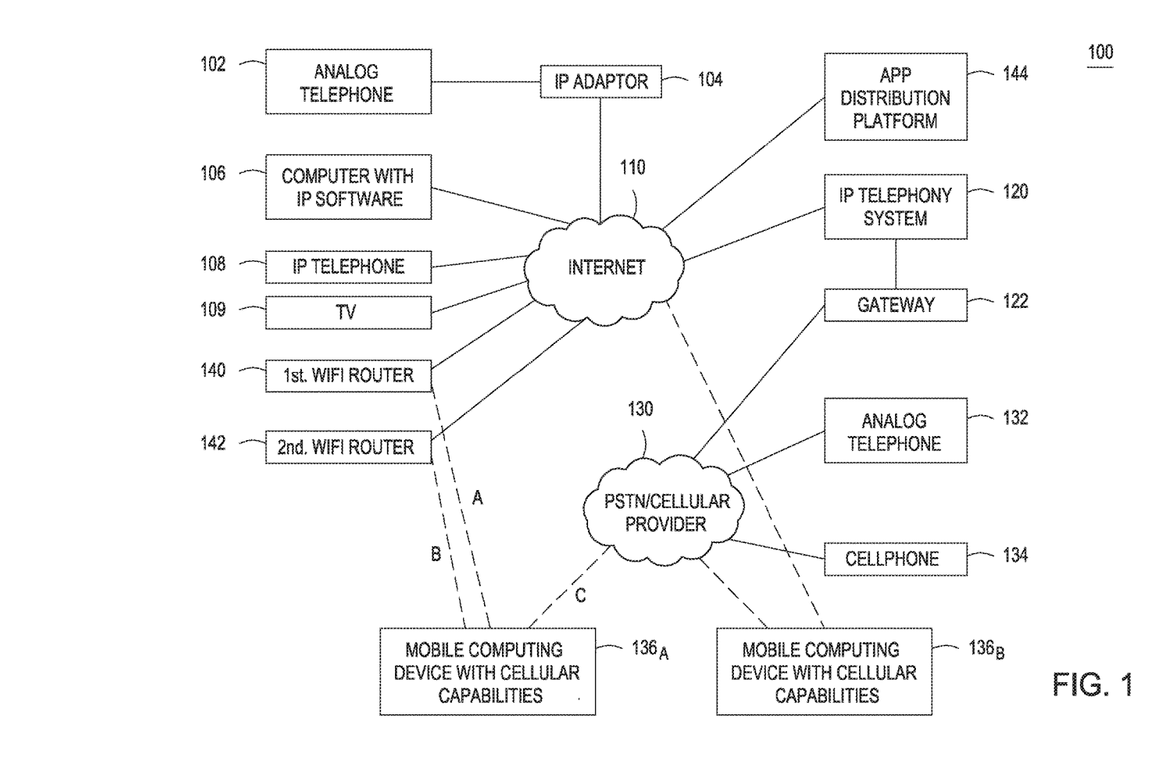
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a wireless local area network (WLAN) based on the Institute of Electrical and Electronics Engineers' (IEEE) 802.11 and 802.13 standards router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switched network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Similarly, mobile computing device with cellular capabilities $136_B$ may also be coupled to internet 110 and/or cellular service provider 130. In some embodiments, mobile computing device $136_B$ may be connected to internet 110 via a wireless local area network (WLAN) based on the Institute of Electrical and Electronics Engineers' (IEEE) 802.11 and 802.13 standards connection, and the like, and can also establish a VOIP telephone call with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device $136_A$ may download a VOIP mobile app from app distribution platform 144 and install the VOIP mobile app locally making the app a native application running on mobile computing device $136_A$.

Figure 2:
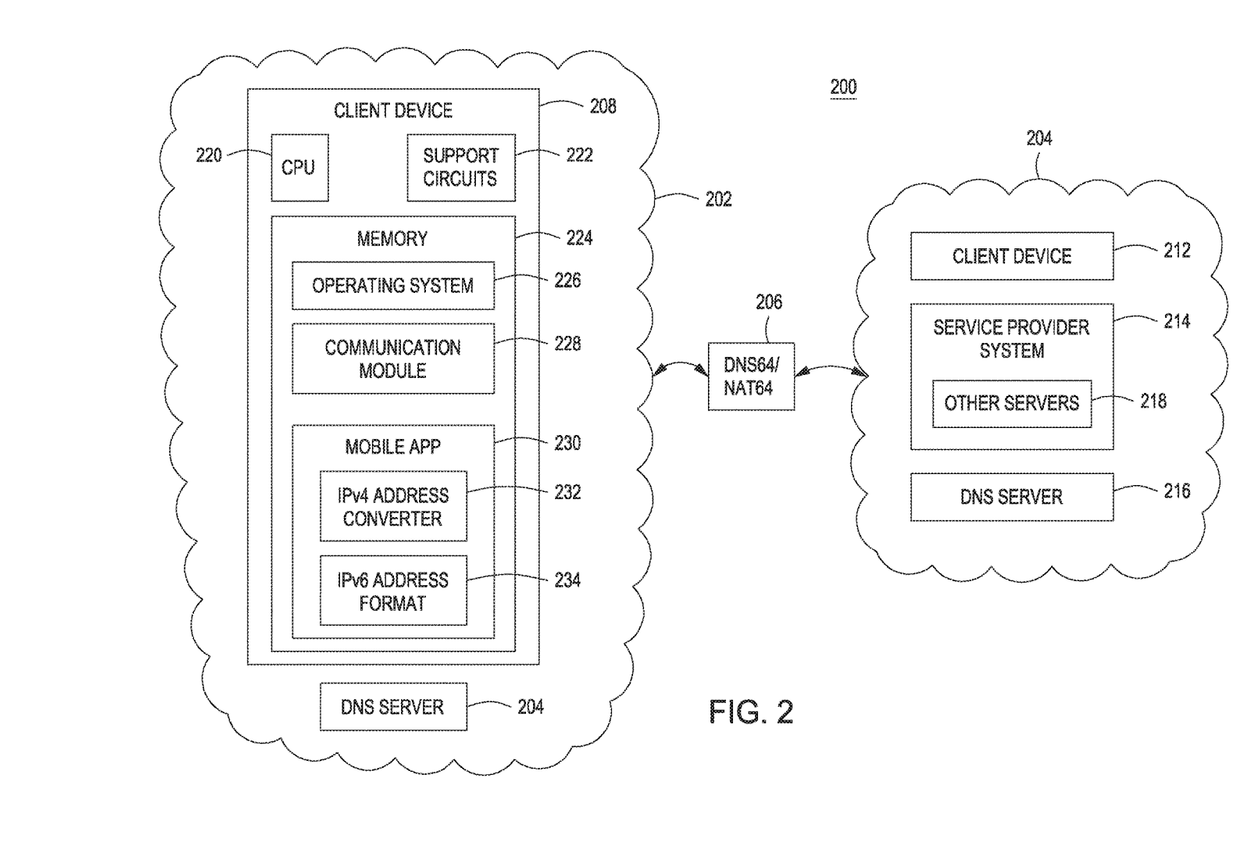
FIG. 2 is a more detailed depiction of the components used to transmit messages associated with IPv4 addresses on an IPv6 network, according to one or more embodiments of the invention.

FIG. 2 is a more detailed depiction of the communication system 200 including components used to transmit messages associated with IPv4 addresses on an IPv6 network, according to one or more embodiments of the invention. The exemplary communication system 200 includes an IPv6 network 202 and an IPv4 network 204, wherein communication is facilitated via a DNS64/NAT64 206. The IPv6 network 202 includes a first client device 208 (i.e., an IPv6 client) and a DNS server 210. The IPv4 network 204 includes a second client device 212 (i.e., an IPv4 client), a service provider system 214, and a DNS server 216.

The two devices 208 and 212 are connected to their respective IP networks 202, 204 that may use Session Initiation Protocol (SIP), Voice over Internet Protocol (VoIP), and the like to form a communication session. The details and functionality of SIP can be found in the Internet Engineering Task Force (IETF) Request for Comments (RFC) Paper No. 3261 entitled, "SIP: Session Initiation Protocol," that is herein incorporated in its entirety by reference. The first and second devices (208, 212) may be electronic user devices (e.g., telephones, personal computers, laptops, smart phones, mobile phones, tablets, and the like).

Each IP network 202, 204 allows for user devices (wired or wireless) to exchange data and voice communications, and is capable of processing the sending and receiving of both voice and data streams between the first client device 208 and the second client device 212.

The first client device 208 includes a CPU 220, support circuits 222, and memory 224. The memory 224 includes an operating system 226, a communication module 228, and a mobile app 230. The mobile app 230 includes an IPv4 address converter 232 and an IPv6 address format 234. The IPv4 address converter 232 includes instructions executable by the CPU 220 to modify SIP signaling information to allow the first client device 208 on the IPv6 network 202 to communicate with the second client device 212 on the IPv4 network 204. The DNS64/NAT64 206 is a DNS64 server which generates IPv6 addresses from IPv4 addresses. The NAT64 component stores the mapping of the addresses, such that it can later perform a translation of IPv6 to IPv4 in order to route messages between the IPv6 network 202 and the IPv4 network 204. The service provider system 214 includes other servers 218 which may include, but are not limited to proxy servers, registrars, media relays, gateways, or other components on an IPv4 network used to facilitate communication between the first client device 208 and the second client device 212. The DNS server 216 includes a database with entries that identify host names, and convert from the host name to a physical IPv4 address or a Canonical Name (CNAME) for each of the service provider's back-end components on the IPv4 network through which the client may communicate.

When the client device 208 receives a message, for example, a SIP signaling request or the message may be SIP message with SDP in the message body, the message includes an address that identifies the location of a component in the IPv4 network where a response to the SIP request or future requests are to be sent (or where to send media packets to and/or expect to receive media packets from). The message may be a request, a response, media, or the like. The address may be anywhere in the message and may be in plain text, Extensible Markup Language (XML), JavaScript Object Notation (JSON), or the like. The address is typically an IPv4 address. Since the client device 208 is on an IPv6-only network, the client device 208 cannot send a response to the IPv4 address. Although the present disclosure is written using a SIP request as an exemplary embodiment, the terms message and response apply to all signaling and media packets that are received on an IPv6 network and transmitted to an IPv4 network.

The IPv4 address converter 232 extracts the IPv4 address from the message and parses the IPv4 address to generate a new host name using the IPv4 address. The new host name is formatted in accordance with the IPv6 address format 234. The IPv4 converter 232 sends the new host name to the NAT64/DNS64 206. The NAT64/DNS64 206 accesses the service provider's DNS server 216 to extract the information in the DNS record associated with the host name/IPv4 address. The NAT64/DNS64 206 generates a new IPv6 address from the retrieved information, stores a mapping to/from the IPv4 and IPv6 addresses and returns the IPv6 address to the mobile app 230. The communication module 228 transmits the response message as usual, as if the original message included to IPv6 address. Because the NAT64 206 stored the mapping of the addresses when the IPv6 address was created, the NAT64 206 can translate the IPv6 address back to the IPv4 address, such that the NAT64 206 can forward any messages to the IPv4 address from the IPv6 network 202.

Figure 3:
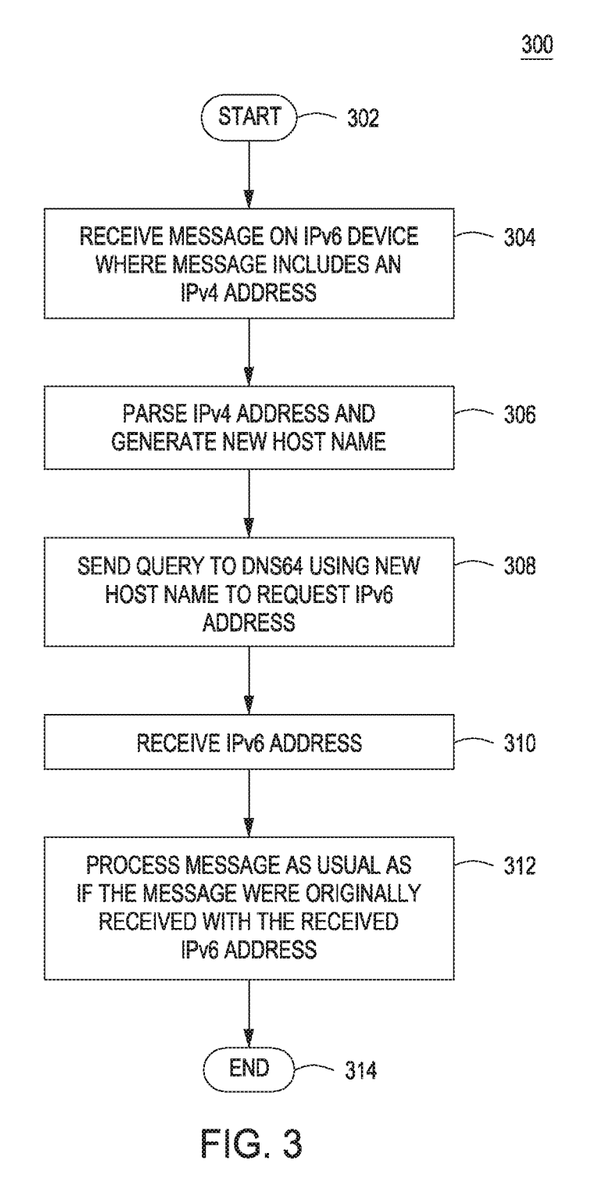
FIG. 3 depicts a flow diagram of a method for transmitting messages associated with IPv4 addresses on an IPv6 network, according to one or more embodiments of the invention.

FIG. 3 depicts a flow diagram for a method 300 for transmitting messages associated with IPv4 addresses on an IPv6 network, in accordance with previous embodiment of the present invention as depicted in FIG. 2. The method 300 is performed by the mobile app 230 on the client device 208.

The method 300 begins at step 302 and proceeds to step 304. At step 304, a message is received on a client device, where the client device is on an IPv6-only network. The message may be a SIP signaling message used for setting up a communication session. The message may be SIP message with SDP in the message body. For example, the message may be a SIP message that includes the address of the initiating mobile device that is on an IPv4 network. Alternately, the message may be received from a proxy server, registrar, media relay, gateway, or other component on an IPv4 network. The message includes the address that identifies the location of the transmitting component on the IPv4 network. The IPv4 address received by the client on the IPv6-only network cannot be used on the IPv6-only network to send and receive media, messages, and the like. An IPv6 address associated with the component is required.

At step 306, the IPv4 address received in the SIP message is parsed and translated into a host name. An IPv4 address is in the form of a.b.c.d. The IPv4 address is translated into a host name using the IPv6 address format. The IPv6 address format may be determined using an API call or hard-coded into the mobile application. For example, the IPv6 address may be in the format prefix_a_b_c_d_posfix.vonage.com, thereby creating a new host name for the IPv4 address. In some embodiments, the components of the IPv4 address are hashed and the new host name is constructed using the hash.

At step 308, the new host name is used to send a query through a DNS64 server. The DNS64 server includes a NAT64 component. The NAT64 takes the IPv4 address and, using the host name, performs a lookup for a DNS record that has been pre-configured on the service provider's DNS server. The DNS64 configures a new IPv6 address based on the DNS record. The NAT64 stores the IPv4 address with the IPv6 address, and returns the IPv6 address.

At step 310, the IPv6 address is received from the NAT64/DNS64 server. At step 312, message is processed as if it were originally received with the IPv6 address. The IPv4 address is replaced with the received IPv6 address on the client device. The address is changed internally on the client device, leaving the received message unchanged. The message is then processed using the received IPv6 address. For example, a response to the message may be sent to the IPv6 address. In the event the message was an SDP message, a connection on the IPv6 address may be opened for transmitting and receiving media. The mobile device may store the received IPv6 address in association with the original IPv4 address. The mobile device continues to transmit and receive messages, responses, media packets, and the like as if it received the IPv6 address in the original message. Since the IPv6 address was received from the NAT64, the NAT64 can forward each packet to the correct IPv4 address outside of the IPv6 network. The method ends at step 314.

The present invention overcomes a number of limitations inherent in current solutions. The use of the IPv6 address format to create a new host name is in contrast to a reverse DNS lookup, where a query for an IPv4 address of a.b.c.d would result in a query of d.c.b.a.-in-addr.arpa. The use of the DNS host name format for reverse DNS lookups requires a service provider to perform some routing tasks, rather than having said tasks performed by the client device, as described in the present disclosure. In addition, the use of a tunneling server to tunnel communications from the IPv6 network to the IPv4 network may be used for various network protocols that are encapsulated using a Hypertext Transfer Protocol (HTTP) protocol. However, this solution requires IP address literals, meaning that if a device is on an IPv6 network and the device receives a Session Description Protocol (SDP) formatted with an IPv4 address, the device is unable to communicate without a tunneling solution. The present invention overcomes this limitation of the SDP protocol by dynamically generating a new host name and using the DNS64 for generating an IPv6 address. As such an IP address literal is not used, thereby alleviating the need to use the HTTP tunneling.

Figure 4:
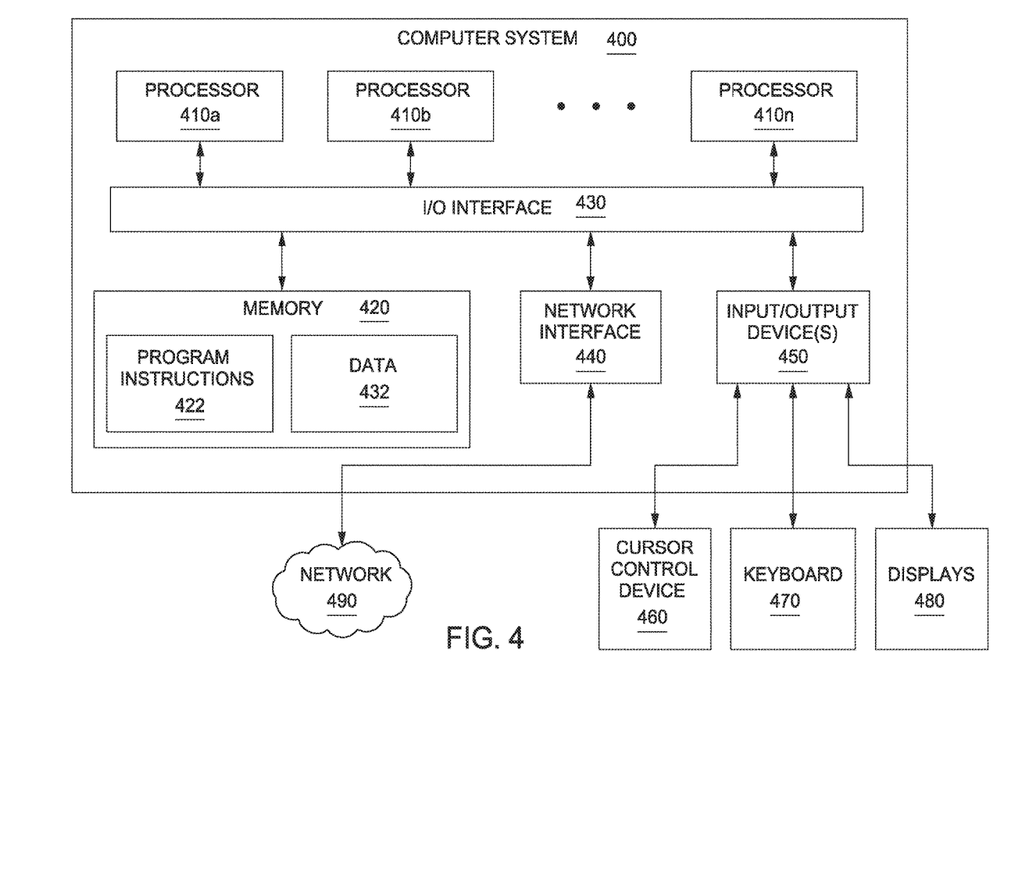
FIG. 4 depicts a computer system that can be utilized in various embodiments of the present invention to implement the computer and/or the display, according to one or more embodiments of the invention.

FIG. 4 depicts a computer system 400 that can be utilized in various embodiments of the present invention to implement the computer and/or the display, according to one or more embodiments.

Various embodiments of method and apparatus for converting from an IPv4 network to an IPv6 network, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 2 and the method illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined.

The invention claimed is:

1. A computer-implemented method for transmitting messages associated with IPv4 addresses on an IPv6 network, comprising:
   receiving, in a first message from an IPv4 network, an IPv4 address of a component in the IPv4 network;
   parsing the IPv4 address into a plurality of elements;
   hashing the plurality of elements of the IPv4 address;
   creating a new host name for the IPv4 address based on the hashed plurality of elements;
   sending, to a domain name server (DNS) associated with the IPv6 network, a request to perform a DNS lookup of the host name;
   responsive to the DNS lookup request, receiving an IPv6 address; and
   processing the first message as if it were originally received with the IPv6 address.

2. The method of claim 1, wherein processing the first message as if it were originally received with the IPv6 address comprises one of transmitting a response to the first message on the received IPv6 address or opening a connection for media transmission on the IPv6 address.

3. The method of claim 1, wherein the first message is a SIP message used in VoIP transactions.

4. The method of claim 3, wherein the first message is a SIP signaling message.

5. The method of claim 1, wherein the IPv4 address identifies a location of where to transmit a response to the first message from the IPv6 network to the IPv4 network.

6. The method of claim 1, wherein the IPv6 address is generated on a DNS64 server, and wherein a NAT64 component of the DNS64 server stores an association of the IPv6 address with the original IPv4 address.

7. The method of claim 1, wherein transmitting a response to the first message as usual as if it were received with the IPv6 address causes all media transfer messages to be routed from the IPv6 network to the IPv4 network without modification of the media transfer messages.

8. A client device comprising:
   a) at least one processor;
   b) at least one input device; and
   c) at least one storage device storing a client application that is connected to an IPv6 network, wherein the client application is preconfigured with an IP address conversion format and configured to:
   receive, in a first message from an IPv4 network, an IPv4 address of a component in the IPv4 network;
   parse the IPv4 address into a plurality of elements;
   hash the plurality of elements of the IPv4 address;
   create a new host name for the IPv4 address based on the hashed plurality of elements;
   send, to a domain name server (DNS) associated with the IPv6 network, a request to perform a DNS lookup of the host name;
   responsive to the DNS lookup request, receive an IPv6 address; and
   process the first message as if it were originally received with the IPv6 address.

9. The client device of claim 8, wherein processing the first message as if it were originally received with the IPv6 address comprises one of transmitting a response to the first message on the received IPv6 address or opening a connection for media transmission on the IPv6 address.

10. The client device of claim 8, wherein the first message is an SIP message used in VoIP transactions.

11. The client device of claim 10, wherein the first message is a SIP signaling message.

12. The client device of claim 8, wherein the IPv4 address identifies a location of where to transmit a response to the first message from the IPv6 network to the IPv4 network.

13. The client device of claim 8, wherein the IPv6 address is generated on a DNS64 server and wherein a NAT64 component of the DNS64 server stores an association of the IPv6 address with the original IPv4 address.

14. The client device of claim 8, wherein transmitting a response to the first message as usual as if it were received with the IPv6 address causes all media transfer messages to be routed from the IPv6 network to the IPv4 network without modification of the media transfer messages.

15. A non-transitory computer readable medium for storing computer instructions that, when executed by at least one processor causes the at least one processor to perform a method for transmitting messages associated with IPv4 addresses on an IPv6 network, when an IPv4 address for a network component is received on an IPv6 network device, comprising:
   receiving, in a first message from an IPv4 network, an IPv4 address of a component in the IPv4 network;
   parsing the IPv4 address into a plurality of elements;
   hashing the plurality of elements of the IPv4 address;
   creating a new host name for the IPv4 address based on the hashed plurality of elements;
   sending, to a domain name server (DNS) associated with the IPv6 network, a request to perform a DNS lookup of the host name;
   responsive to the DNS lookup request, receiving an IPv6 address; and
   processing the first message as if it were originally received with the IPv6 address.

16. The computer readable medium of claim 15, wherein processing the first message as if it were originally received with the IPv6 address comprises one of transmitting a response to the first message on the received IPv6 address or opening a connection for media transmission on the IPv6 address.

17. The computer readable medium of claim 15, wherein the first message is an SIP message used in VoIP transactions.

18. The computer readable medium of claim 17, wherein the first message is a SIP signaling message.

19. The computer readable medium of claim 15, wherein the IPv4 address identifies a location of where to transmit a response to the first message from the IPv6 network to the IPv4 network.

20. The computer readable medium of claim 15, wherein the IPv6 address is generated on a DNS64 server and wherein a NAT64 component of the DNS64 server stores an association of the IPv6 address with the original IPv4 address.

\* \* \* \* \*